United States Patent Office 3,410,108
Patented Nov. 12, 1968

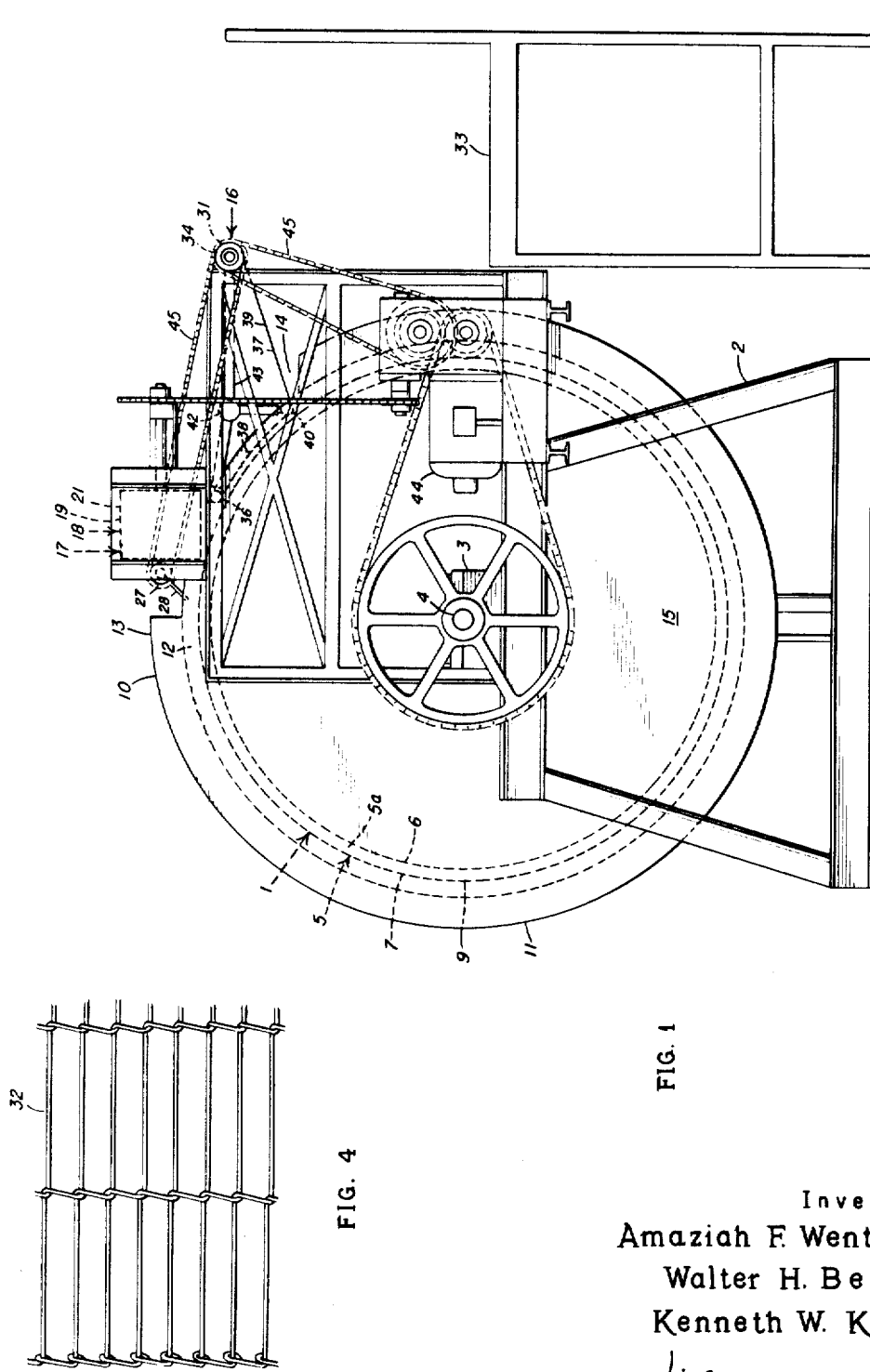

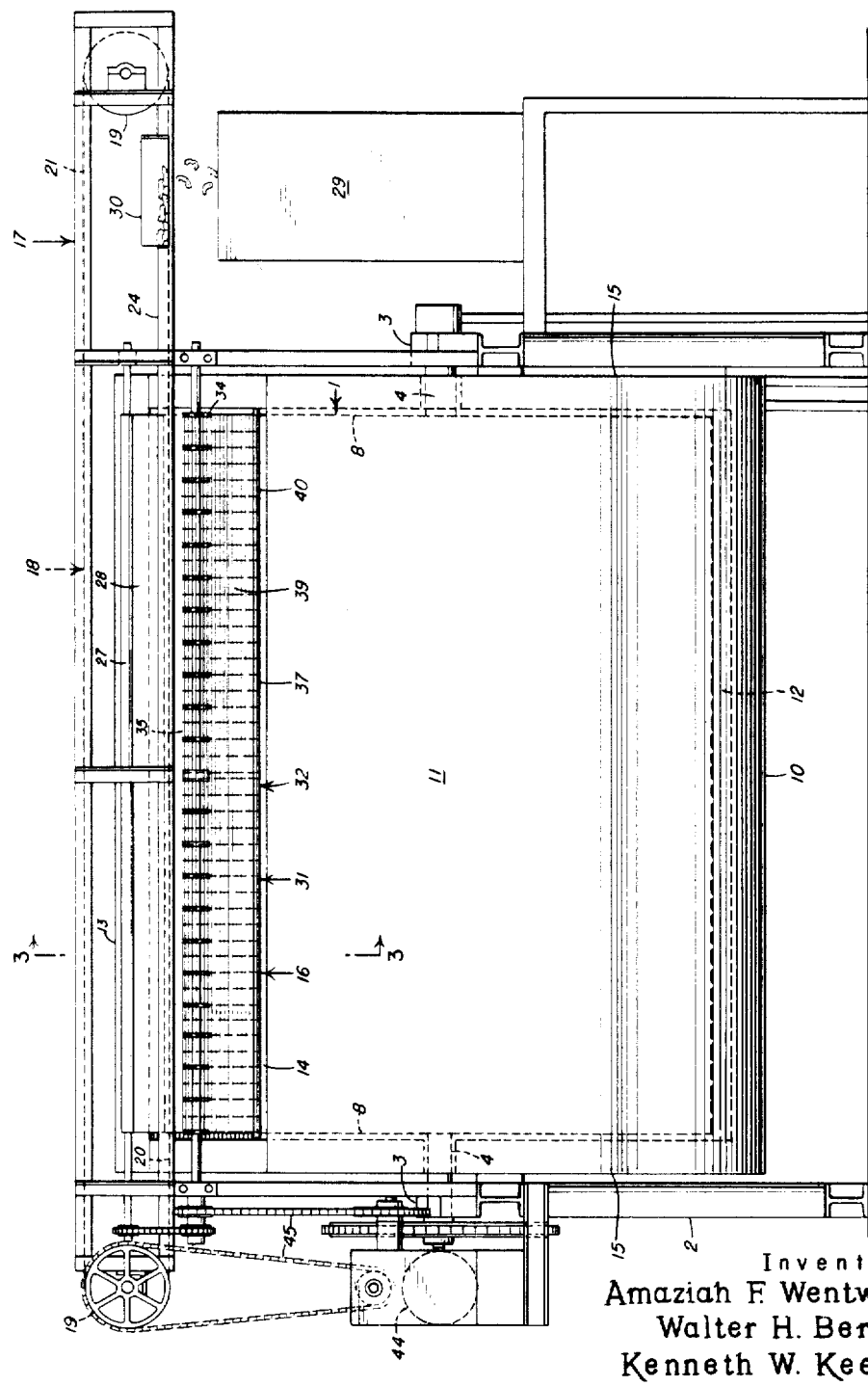

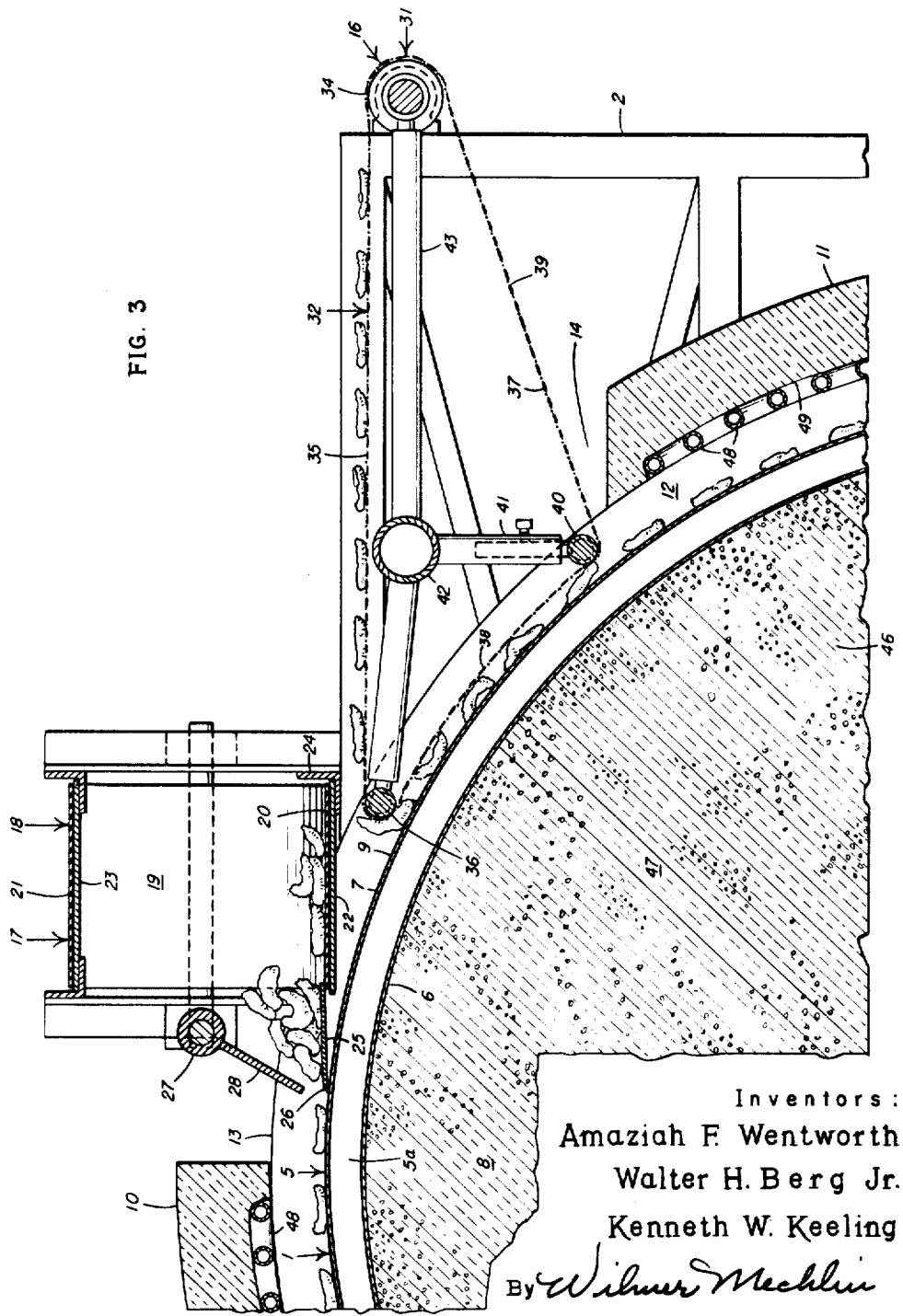

3,410,108
APPARATUS FOR QUICK FREEZING
SOLID FOODS
Amaziah F. Wentworth, Clearwater, Walter H. Berg, Jr., Brandon, and Kenneth W. Keeling, Tampa, Fla., assignors to A. F. Wentworth & Associates, Inc., Tampa, Fla., a corporation of Florida
Filed Sept. 16, 1966, Ser. No. 579,982
16 Claims. (Cl. 62—341)

ABSTRACT OF THE DISCLOSURE

The invention is concerned with an apparatus for individually quick freezing solid foods including a horizontally rotatable freezing drum having an internally refrigerated cylindrical freezing surface, a housing which completely encloses the drum except for an access opening which extends crosswise in the upper portion thereof for access to the upper portion of the drum with means extending through said access opening for individually feeding unfrozen foods gravitationally onto the surface of the drum and for discharging frozen foods from the surface of the drum in which the feed means comprises a feed conveyor means disposed parallel to the axis of the drum with a portion of the return flight of the feed conveyor means partially wrapping the portion of the freezing surface immediately beyond the feed for pressing the applied food against the surface during the initial portion of its engagement with the drum.

---

This invention relates to the individual quick freezing of shrimp and other solid foods and has for its primary object the provision of improved apparatus for so freezing such foods.

Another object of the invention is to provide improved apparatus for individually quick freezing solid foods wherein the foods are frozen on an internally refrigerated surface of a rotary drum and the foods are so applied and removed as to permit substantially the entire surface to be used effectively for freezing.

An additional object of the invention is to provide quick freezing apparatus wherein solid foods are individually quick frozen on an internally refrigerated surface of a horizontally rotating drum enclosed in an insulated casing and the foods are both applied to and removed from the drum adjacent the top of the casing, thereby rendering it unnecessary to employ sealing flaps to minimize the loss of cold.

A further object of the invention is to provide quick freezing apparatus wherein foods are individually fed from above to an internally refrigerated surface of a horizontally rotatable drum by an endless feed conveyor and use is made of both gravity and pressure applied by the conveyor to cause the foods to bond to the surface.

Another object of the invention is to provide quick freezing apparatus wherein frozen foods, on detachment from an internally refrigerated surface of a drum on which they are frozen, are carried directly from the surface to a glazing tank by an endless conveyor disposed and moving across the surface and so loaded as to make substantially full use of its capacity.

Other objects and advantages of the invention will appear hereinafter in the detailed description, be particularly pointed out in the appended claims and be illustrated in the accompanying drawings, in which:

FIGURE 1 is a side elevation view of a preferred embodiment of the improved quick freezing apparatus of the present invention;

FIGURE 2 is a front elevational view of the apparatus of FIGURE 1 with the platform removed and glazing tank added to more clearly illustrate certain of the details of construction;

FIGURE 3 is a fragmentary vertical sectional view on an enlarged scale taken along line 3—3 of FIGURE 2; and FIGURE 4 is an enlarged fragmentary plan view showing a portion of the feed belt.

Referring now in detail to the drawings in which like reference characters designate like parts, the improved quick freezing apparatus of this invention is designed for individually freezing solid foods on an internally refrigerated surface of a rotary drum and is adapted to so freeze any solid foods, such as shrimp, oysters, citrus fruit segments and meat patties, that, at the temperature of the surface, can be secured thereto by a frozen moisture bond of sufficient strength to hold them on the surface during freezing. In this respect the improved apparatus is similar to those of Carpenter Patent No. 3,020,732, Wentworth Patent No. 3,048,987 and Wentworth et al. Patent No. 3,245,226.

The improved apparatus is comprised of a rotary drum 1 mounted for rotation about a horizontal axis on a stand or supporting frame 2 in bearings 3 fixed to the stand and journalling the concentric stub axles or trunnions 4 at the drum's opposite ends which preferably serve as its axle. The drum 1 has a hollow or double side wall 5 formed at the sides of radially spaced inner and outer side sheets 6 and 7 and conveniently closed at the ends by the preferred apertured end discs or plates 8 by which the wall is supported on the axles 4.

Made of stainless steel or like suitable non-corrosive, thermally conductive material, the outer side sheet 7 has a smooth, uninterrupted cylindrical outer surface 9 which forms the side, peripheral or freezing surface of the drum. Foods are frozen on this surface primarily by heat transfer by conduction through the outer side sheet 7 to "Freon 22" or other suitable refrigerant circulated internally through the side wall 5, which may be led between the side wall 5 and a suitable compressor (not shown) through suitable fluid swivel connections (not shown) in one or each of the axles 4 and is injected into the hollow space 5a inside the wall for expansion in a suitable system of coils or passages (not shown) contained in that space. To minimize loss of heat or, more precisely, cold to ambient air and avoid the necessity of insulating the area in which the apparatus is located, the drum 1 is contained or housed in a suitably insulated cylindrical insulating jacket or housing 10, the side or side wall 11 of which is radially spaced from and forms with the drum's side or freezing surface 9 an open-ended, closed-sided freezing chamber or compartment 12.

Otherwise closed, the jacket 10 has in its upper part 13 an upwardly opening access opening, aperture or slot 14. Extending across or the length of the jacket 10 and interrupting or opening through the latter's side 11 and ends 15, the access opening 14 opens radially inwardly and downwardly onto an upper part of the freezing surface or side 9 of the drum and exposes or presents that part over the surface's entire width. Circumferentially, the access opening 14 may straddle or embrace the top or vertex and extend into both upper quadrants of the drum 1 and its jacket 10, but preferably is substantially entirely contained in the upper portion of the drum's and jacket's trailing upper quadrant.

As the only normally open opening in the jacket 10, the access opening 14 is a combined feed and discharge opening used for both feeding foods for freezing to and discharging frozen foods from the freezing surface 9. Located toward the advance or upper end of the opening 14, in advance of the unfrozen food feed 16 in a direction counter the direction of rotation of the drum, the frozen food discharge 17 includes an endless belt discharge conveyor 18 extending horizontally, longitudinally of the drum 1, across the freezing surface 9, parallel to that surface and the axis of the drum. Carried at its ends on horizontally rotatable pulleys 19 mounted on the stand 2 beyond the ends of the jacket 10, the discharge 18 overlies the freezing surface 9 with its advance, or lower, food carrying or transporting flight 20 adjacent or contiguous to that surface and in and extending longitudinally of the drum through the access opening 14 and its return flight 21 spaced above both the freezing surface and the advance flight. Preferably horizontal and parallel, the lower and upper flights 20 and 21 desirably are guided across the freezing surface 9 on correspondingly disposed lower and upper guide shelves 22 and 23 suitably supported on the stand 2, the lower shelf conveniently being an angle with an upturned lip or flange 24 along its outer side away from the freezing surface and the upper shelf an upturned channel.

For severing, detaching or breaking frozen foods from the freezing surface 9, as they exit from the trailing end of the freezing chamber 12, and directing them onto the advance flight 20 of the discharge conveyor 18, a suitably supported breaker blade or bar 25 extend across the freezing surface on the advance side of the lower shelf 22. Leading from the freezing surface 9 to the lower shelf 22, the preferred breaker blade 25 has its leading edge 26 substantially in contact or engagement with the freezing surface so as to break the frozen moisture bonds of the foods at the surface and also scrape off any accumulated frost or preferably snow, which, if left on the surface, would progressively reduce the efficiency of the freezing.

In addition, the breaker blade 25 preferably is of substantial width and slopes or is inclined upwardly toward the lower guide shelf 23, with the width and slope such as to enable the blade temporarily to hold back or restrain the severed foods from the conveyor's advance flight 20 until a batch or quantity has built up or accumulated which preferably is sufficient to load or fill the part or area of the flight overlying the freezing surface to its capacity for the particular food. At that time or interval, the batch of frozen foods is pushed from the breaker blade 25 and loaded onto the advance flight 20 by a paddle wheel 27 mounted above the drum for rotation counter thereto about a horizontal axis parallel to the freezing surface and the drum's axis and having one or more flat plastic or other suitable paddles or blades 28 extending the full width of the freezing surface and adapted at predetermined intervals to sweep substantially across the underlying breaker blade. By synchronizing the linear speed of the discharge conveyor 18 and the rotation of the paddle wheel 27 with the rotation of the drum 1, it is thus possible to delay each loading of the conveyor until the preceding batch or loading has cleared the freezing surface and by applying another batch at that time or interval, obtain a uniform and preferably full or capacity load on the discharge conveyor, with consequent uniformity of the rate at which the frozen foods are discharged.

The ability of the above arrangement to regulate the rate of discharge of frozen foods from the freezing drum not only enables that rate to be correlated with the rate at which the drum is fed but, in the preferred form of the apparatus, also permits regulation of the feed to a glazing tank 29. Of the upright, open top type disclosed in Keeling application Ser. No. 525,686, filed Feb. 7, 1966, the preferred glazing tank 29 is located at an end of the drum 1 below a projecting part of the discharge conveyor 18. Frozen foods are discharged or directed into the tank 29 by a plough 30 disposed above the tank and beyond the drum and positioned oblique to and in the path of the foods on advance flight 20 of the discharge conveyor. Glazed in the tank 29 in the manner described in the Keeling application, the frozen foods on leaving the tank are ready for packaging as "rattling" frozen foods.

The feed 16, by which foods to be frozen are fed through the access opening 14 to a part of the freezing surface 9 presented or exposed at that opening, includes a feed conveyor 31 projecting or extending from a point in front of the drum 1 to the freezing surface at right angles or normal to the drum's axis. Coextensive in width with the freezing surface, and extending at right angles to the discharge conveyor 18 as well, the feed conveyor is designed to deliver foods to the freezing surface at a point or along a line beyond but as close as practical to the breaker blade 25. To this end, the feed conveyor preferably extends rearwardly under and has its drum end horizontally overlapped by the discharge conveyor, with the extent of the overlap determined by the vertical spacing required between the feed conveyor and the lower shelf 22 to accommodate whatever foods are to be frozen in the apparatus.

The form of the feed conveyor 31 may vary depending on the types of solid foods a particular apparatus is destined to freeze. Delivering foods to an upper quadrant of the freezing surface 9, the feed conveyor will have the benefit in any case of the force of gravity for supplying at least part of the pressure required at the temperature of the surface to establish the frozen moisture bond necessary for securing each food to the surface. If, as in the case of the foods mentioned in Wentworth Patent No. 3,048,987, the pressure derived from gravity will suffice, the feed conveyor can be a vibrator conveyor such as disclosed in that patent and such a conveyor will enable the circumferential extent or width of the access opening to be held to a very minimum. However, additional pressure will usually be required and it is this that the illustrated conveyor is designed to supply.

Preferred for its wider adaptability, the illustrated feed conveyor 31 is an endless belt conveyor having a tensioned, flexible, non-corrosive belt 32 which suitably may be formed of wide mesh screening woven from stainless steel wire. At its outer end, which for manual loading may be over a railed loading platform 33 on which the operators stand, the belt 32 rides over a pulley 34. From the outer pulley 34, which conveniently can be the drive pulley, the belt 32 moves in its preferred horizontal advance or food carrying or transporting flight 35, to the conveyor's rear end at the freezing surface 9, where it is supported and turns downwardly on a rear or inner support 36 which may be an idler roller or, as illustrated, simply a smooth cylindrical rod or bar.

Instead of paralleling the advance flight 34, the return flight 37 of the belt 31 is divided into two angularly related legs, one a rear or advance leg 38 in which the belt after turning downwardly over the rear support 36 follows or wraps the freezing surface 9 for a distance and the other a front or trailing leg 39 in which the belt returns to the front or outer support or drive pulley 34. Guidance of the belt 32 in these legs is the function of an intermediate or lower support 40 which is disposed adjacent the drum surface 9 below the level of the other supports and, together with the latter, parallels that surface and the drum's axis. This intermediate support 40 also conveniently serves as a belt tensioning device by connecting it by telescoping connections 41 to a cross bar 42 of a conveyor frame 43 mounting the several supports and in turn mounted on the stand 2.

While turning overall counter the direction of rotation of the drum 1, the feed belt 32 in the rear leg 38 of its return flight 37 moves in the same direction as and parallel to the freezing surface 9. As the foods to be frozen first reach or are delivered to the freezing surface, they drop off the feed belt 32 and are applied to the surface solely under the influence of gravity. In the case of shrimp in particular, this initial gravity application has the advantage of enabling the relatively thin tails of the shrimp to make contact with and initially bond to the surface, a result the thicker bodies of the shrimp interfere with when the application is by pressure other than gravity.

Almost instantly after they have contacted the freezing surface, the unfrozen foods from the feed conveyor 31 pass under the rear leg 38 of the return flight 37 of the belt 32 and, to the end of that leg, are subjected to the additional pressure predetermined by the tensioning of the belt. Thus, any foods that may have been only loosely attached by the force of gravity, will have been securely attached by the additional pressure exerted by the conveyor by the time they reach the lower end of the rear leg 38. Not only does the very brief interval between the initial gravity application and the subjection to the pressure of the belt prevent appreciable movement of even loosely attached foods on the surface in the interim, but, by synchronizing the drive of the feed conveyor with that of the drum so that both the belt 32 and the freezing surface 9 travel at the same linear speed, the initial location of any food on the surface is not disturbed by its subjection to the pressure of the belt.

Whether the loading of the feed belt 32 is automatic or, as in the illustrated embodiment, manual, the feed conveyor 31 is designed for and capable of feeding foods to the freezing drum 1 at a substantially uniform rate, which for most efficient operation, is gauged to the freezing capacity of the drum. Even in the case of the manually loaded illustrated embodiment, once the foods have been placed on the feed belt 32 in the non-overlapping relation desired for individual presentation to the freezing surface 9, the action is entirely automatic through the glazing step in which the individually frozen foods are glazed in the glazing tank 29.

In the preferred operation, the feed conveyor 31 is synchronized with the drum 1 to feed or move the unfrozen foods to the drum at the linear speed at which the freezing surface 9 is turning or moving and the linear speed of the discharge conveyor 18 and rotative speed of the paddle wheel 27 by which the discharge conveyor is intermittently loaded, in turn are synchronized with the drum and feed conveyor so as to discharge frozen foods from the freezing surface into the glazing tank 29 at the rate at which the unfrozen foods are fed to the drum. Conveniently, the drum 1 is rotated by an electric or other suitable motor 44 through suitable reduction gearing (not shown) and the conveyors 18 and 31 and paddle wheel 27 are driven off the drum through suitable gearing, preferably by chain drives 45 for the nicety of control they afford. Whether or not the glazing tank 29 is driven off the drum, its drive also should be synchronized so that it will glaze the frozen foods at the rate at which they are frozen.

The freezing of foods on the freezing surface 9 is a temperature-time dependent operation, the temperature that of the surface 9 through which heat from the foods is transferred to the internal refrigerant and the time that required to freeze the foods solid. The time will vary inversely with the temperature, although not at a constant ratio. Both for quick freezing and to cause any moisture in the air to which the freezing surface 9 is exposed to deposit thereon as readily removable snow rather than as frost, the temperature should be below −35° F., in a range from that maximum to a minimum of about −85° F., and preferably is around −80° to −85°. While for the most part the freezing will occur in the freezing chamber 12, it will begin immediately on contact of the foods with the freezing surface 9, since the whole of that surface is at the same low temperature. The minimum spacing or close adjacency in the improved apparatus between the point at which unfrozen foods are applied to the drum by the feed conveyor 31 and that at which they are removed from the drum by the breaker blade 25, which in a 6-ft. diameter drum renders some 97% or substantially the entire freezing surface effective for freezing, thus has the advantage of providing a maximum freezing time for a given diameter and speed of rotation of the drum and the further advantage of practically inhibiting the presence of snow on the surface when the foods are first presented, due to the very brief interval between the cleaning of the surface by the breaker blade and its presentation to the unfrozen foods.

The moisture which freezes as the foods are applied to the surface to establish the bond therebetween, will be surface moisture remaining from a previous treatment or applied in advance of the apparatus and in either case will form so thin a film between an individual food and the drum surface as to be practically discountable in the heat transfer. Too, although effectively attaching the foods to the surface during freezing, the thin ice film bond will have become so brittle by the time the foods are frozen solid as to be readily broken without damage to the frozen foods by the gentle blow applied by the breaker blade 25.

Among foods, the time required for freezing will vary with the bulk and latent heat of the individual foods and also with the shape, since the latter will determine the area of contact between each food and the freezing surface. However, the time required for a particular food is readily determinable and for shrimp of average size with the surface at the preferred low temperature will be around five minutes. Not only is this time minimal but the correspondingly low speed of rotation of the drum 1, by practically eliminating any turbulence in the surrounding air, enables the freezing to be conducted in practically still air with consequent minimizing of the loss of moisture from the foods to the air and, in conjunction with the upward opening of the access opening 14, loss of cold even to the ambient air outside that opening. A further advantage, derived from the location of the discharge conveyor 18 at substantially the top of the drum, is the ability to discharge the frozen foods into the glazing tank 29 without elevating them in between.

While the limited arcuate extent of the combined feed and discharge opening 14 and its location proximates to the top of the jacket 10, together with the slow speed of rotation of the drum 1, do minimize interchange of the heavier cold air in the jacket with outside air, the movements of the feed and discharge conveyors 18 and 31, as well as the drum, make some interchange through the opening unavoidable. As a consequence, some cold from the refrigerant injected into the hollow space 5 will be lost through the inner sheet 6 to the drum's interior 46 unless the latter is sealed off. In addition, exposure of the inner sheet to air inside the side wall 5 would result in a considerable loss at the start of a freezing operation as the temperature of that air was reduced to the desired freezing temperature. Any such loss is effectively prevented by covering the inside of the inner sheet 6 with insulation 47, conveniently in the form of polyurethane or like cellular foam insulation injected into and filling the interior 46 of the drum. In some cases it also may be desired to supplement the freezing action of the refrigerant in the hollow wall 5 of the drum. This is readily accomplishable, without affecting the substantial deadness of the air in the freezing chamber 12, by introducing a suitable refrigerant into freezing or refrigerating coils 48 mounted on and preferably embedded in the inner face or inside 49 of the side 11 of the jacket 10.

From the above detailed description it will be apparent that there has been provided an improved quick freezing apparatus for individually freezing solid foods which enables such foods to be frozen continuously and with maximum efficiency. It should be understood that the described and disclosed embodiment is merely exemplary of the invention and that all modifications are intended to be included that do not depart from the spirit of the invention and the scope of the appended claims.

Having described our invention, we claim:

1. Apparatus for individually quick freezing solid foods comprising a horizontally rotatable rotary freezing drum having an internally refrigerated cylindrical freezing surface, a jacket enclosing said surface except for an access opening in and opening downwardly through a top portion of said jacket and means in said access opening for individually feeding unfrozen foods to and discharging frozen foods from said surface, said feeding means including feed conveyor means disposed parallel to an axis of the drum wherein the feed conveyor means includes a tensioned feed belt having an advance flight for feeding unfrozen food from above to the freezing surface and applying said foods thereto by gravity and a return flight continuous with said advance flight and wrapping a part of the surface exposed by the access opening for subjecting the applied foods to a pressure at which at the temperature of the surface they will bond thereto.

2. Apparatus as claimed in claim 1 in which the belt of the feed conveyor means is an open mesh woven stainless steel wire belt.

3. Apparatus as claimed in claim 1 in which the access opening is dimensioned to have a width corresponding to the width of the drum.

4. Apparatus as claimed in claim 1 in which the feed conveyor means is dimensioned to have a width corresponding to the width of the drum.

5. Apparatus as claimed in claim 1 in which the feed conveyor means and discharge means are in such close adjacency that substantially the entire freezing surface of the drum is available for freezing foods.

6. Apparatus as claimed in claim 1 in which the discharge means comprises discharge conveyor means disposed normal to the axis of the drum.

7. Apparatus as claimed in claim 1 in which the refrigerating surface is an outside of the hollow side wall of the drum and in which the inside of said wall is insulated.

8. Apparatus as claimed in claim 7 in which the drum within the side wall is filled with foam insulation.

9. Apparatus as claimed in claim 1 in which freezing coils are mounted on an inside of the jacket for supplementing the freezing action of the freezing surface on the drum.

10. Apparatus for individually quick freezing solid foods comprising a horizontally rotatable freezing drum having an internally refrigerated cylindrical freezing surface, a jacket enclosing the surface of the drum, an access opening in the jacket extending crosswise of the drum in the upper portion of the jacket for access to the upper portion of the drum, means extending through said access opening for individually feeding unfrozen foods gravitationally onto the surface of the drum so as to adhere to the freezing surface of the drum and for discharging frozen foods from the surface of the drum, said feeding means including feed conveyor means disposed parallel to the axis of the drum, said discharge means comprising discharge conveyor means disposed normal to the axis of the drum and including breaker plate means extending across the freezing surface for detaching frozen foods therefrom and directing said frozen foods towards the discharge conveyor means, said feed conveyor means and discharge means being in such close adjacency that substantially the entire freezing surface of the drum is available for freezing foods.

11. Apparatus as claimed in claim 10 wherein the feed conveyor means includes a tensioned endless feed belt partially wrapping in its return flight an upper part of the freezing surface exposed by the access opening for initially applying unfrozen foods to the freezing surface by gravity and thereafter in its return flight pressing said unfrozen foods against the surface of the drum.

12. Apparatus for individually quick freezing solid foods comprising a horizontally rotatable rotary freezing drum having an internally refrigerated cylindrical freezing surface, a jacket enclosing said surface except for an access opening in and opening downwardly through a top portion of said jacket, and means in said access opening for individually feeding unfrozen foods to and discharging frozen foods from said surface, said feeding and discharge means respectively including feed conveyor means and discharge conveyor means respectively disposed parallel and normal to an access of said drum, said discharge conveyor means including a breaker blade means extending across the freezing surface for detaching frozen foods therefrom and directing said frozen foods towards the discharge conveyor means, and horizontally rotatable paddle means for loading the frozen foods detached by said blade means onto said conveyor means and wherein the feed conveyor means includes a tensioned feed belt having an advance flight for feeding unfrozen foods from above to the freezing surface and applying said foods thereto by gravity, and a return flight disposed below said advance flight and wrapping a part of the surface exposed by the access opening for subjecting the applied foods to a pressure at which, at the temperature of the surface, they will bond thereto.

13. Apparatus as claimed in claim 12 wherein the feed and discharge conveyor means and paddle means are synchronized in drive with the drum, the feed conveyor means for moving the belt thereof at the same linear speed as the freezing surface and the discharge conveyor means and paddle means for discharging frozen foods from the surface at substantially the rate at which unfrozen foods are fed thereto by the feed conveyor means.

14. Apparatus for individually quick freezing solid foods comprising a horizontally rotatable rotary freezing drum having an internally refrigerated cylindrical freezing surface, a jacket enclosing said surface except for an access opening in and opening downwardly through a top portion of said jacket, and means in said access opening for individually feeding unfrozen foods to and discharging frozen foods from said surface, said feeding and discharge means respectively including feed conveyor means and discharge conveyor means respectively disposed parallel and normal to an access of said drum, said discharge conveyor means including breaker blade means extending across the freezing surface for detaching frozen foods therefrom and directing said frozen foods towards the discharge conveyor means, and horizontally rotatable paddle means for loading the frozen foods detached by said blade means onto said conveyor means, and wherein the blade means slopes upwardly towards the discharge conveyor means for causing the detached frozen foods to be held back from the discharge conveyor for loading in batches thereonto by the paddle means and which includes an upright glazing tank adjacent an end of the freezing drum, and wherein the discharge conveyor means includes an endless discharge conveyor belt having an advance flight adjacent the freezing surface for receiving frozen foods therefrom and a return flight spaced above said advance flight, and said advance flight extends across said freezing surface and beyond said end of the drum above said glazing tank for discharging frozen foods downwardly thereinto.

15. Apparatus according to claim 14 wherein the advance flight of the discharge conveyor belt is guided across the freezing surface on a horizontally disposed shelf.

16. Apparatus according to claim 15 wherein the shelf is spaced above the freezing surface and the feed conveyor means and horizontally overlaps the feed conveyor means.

References Cited

UNITED STATES PATENTS

| | | | |
|---|---|---|---|
| 2,007,837 | 7/1935 | Rudd et al. | 62—346 X |
| 2,123,596 | 7/1938 | Doering | 62—346 |
| 2,178,780 | 11/1939 | Doering | 165—91 |
| 2,954,613 | 10/1960 | Baker | 34—112 X |
| 3,048,987 | 8/1962 | Wentworth | 62—346 X |
| 3,245,226 | 4/1966 | Wentworth et al. | 62—346 |

ROBERT A. O'LEARY, *Primary Examiner.*

W. E. WAYNER, *Assistant Examiner.*